J. BEARD.
GAS HEATER.
APPLICATION FILED JAN. 19, 1918.
1,279,226.
Patented Sept. 17, 1918.
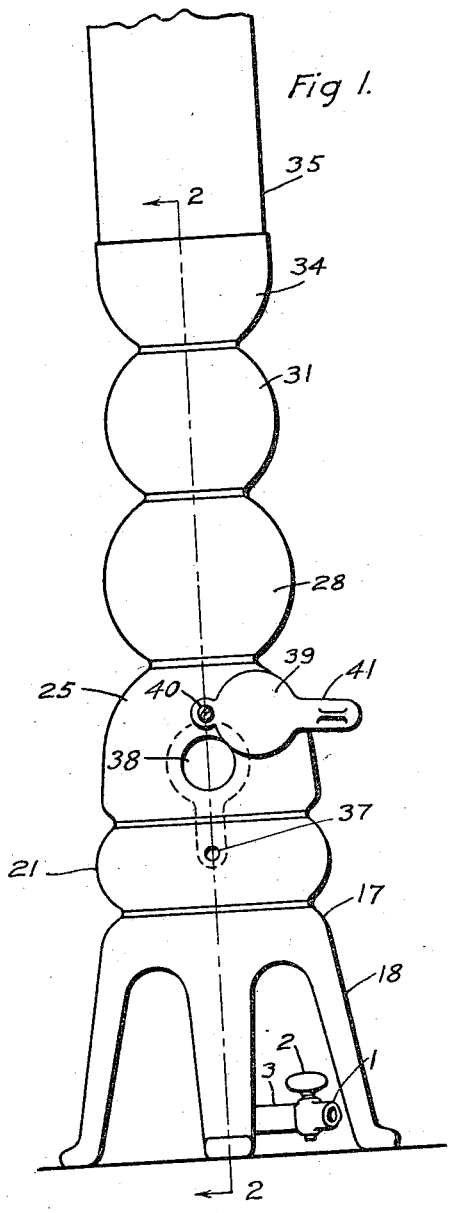
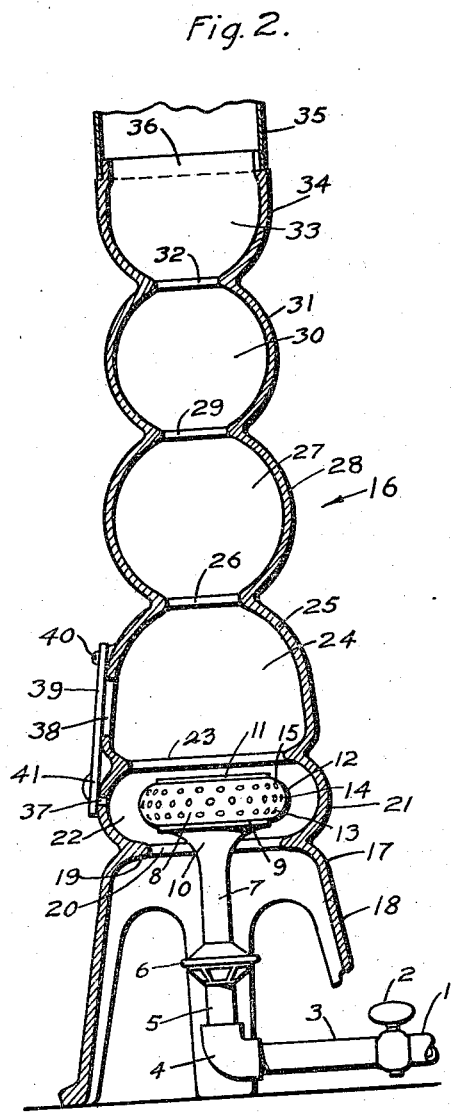
INVENTOR
JAMES BEARD
BY Hazard & Miller
ATTORNEYS ively and substantially.
UNITED STATES PATENT OFFICE.

JAMES BEARD, OF PASADENA, CALIFORNIA.

GAS-HEATER.

1,279,226.  Specification of Letters Patent.  Patented Sept. 17, 1918.

Application filed January 19, 1918. Serial No. 212,716.

*To all whom it may concern:*

Be it known that I, JAMES BEARD, a subject of the King of Great Britain, having declared my intention of becoming a citizen of the United States, residing at Pasadena, in the county of Los Angeles and State of California, have invented new and useful Improvements in Gas-Heaters, of which the following is a specification.

My object is to make an improved gas heater especially for domestic uses, such as heating a room, heating water, and the like, the heater being so constructed as to produce perfect combustion and radiate a very large percentage of the heat and then discharge the products of combustion to a flue.

Figure 1 is a front elevation of a heater embodying the principles of my invention.

Fig. 2 is a vertical central section on the line 2—2 of Fig. 1.

The gas supply pipe 1 is connected to a regulating valve 2. A nipple 3 leads from the regulating valve 2 to the elbow 4 and the nozzle 5 discharges straight up from the elbow 4 through the air mixer 6 into and through the mixing chamber 7 to the burner head 8. The burner head 8 is circular in plan and has a flat lower side 9 connected to the tubular mixing chamber 7 by a funnel-shaped portion 10. The burner head 8 has a flat upper side 11, said flat sides 9 and 11 being substantially equal and in vertical alinement, and the burner screen 12 between the flat sides 9 and 11 bulges all the way around like a pneumatic tire and preferably there are three rows of perforations, the lower row 13 discharging outwardly and downwardly, the central row 14 discharging horizontally, and the upper row 15 discharging outwardly and upwardly. A cross-section of the wall of the screen at any point between the outer edges of the flat portions 9 and 11 is substantially a semi-circle.

The details of the radiating combustion chamber, that is the stove or heater proper, 16, are as follows: The base 17 is circular in plan, has legs 18 extending downwardly, and an annular flange 19 extending inwardly, there being an air inlet opening 20 surrounded by said flange. The wall 21 of the primary combustion chamber 22 extends upwardly from the flange 19, the wall of the chamber being semi-circular in cross-section and circular in plan and concentric to the burner screen 12, and a considerable distance from the screen, thus producing a chamber of ample size for primary combustion. The opening 23 leads from the primary combustion chamber 22 through a secondary combustion chamber 24 within the wall 25, and the opening 26 leads from the secondary combustion chamber 24 to the third combustion chamber 27 within the wall 28. The opening 29 leads from the combustion chamber 27 to the combustion chamber 30 within the wall 31, and the opening 32 leads from the chamber 30 to the chamber 33 within the wall 34, and the flue 35 leads the products of combustion out of the room. The lower part of the wall 25 is the same size in plan as the wall 21 and substantially twice the height, the upper part of the wall being curved inwardly so that the opening 26 is only about one-half the diameter of the openings 20 and 23. The wall 28 is spherical in form, has flattened upper and lower ends, the passage 26 being slightly larger than the passage 29, and the chamber 27 being smaller than the chamber 24. The wall 31 is similar to the wall 28, drawn on a smaller radius, and the passage 32 is still smaller than the passage 29. The wall 34 is flattened and enlarged at its upper end to make a free passage 36 leading to the flue. The stove thus produced is preferably cast all in one piece although it may be cast in sections and secured together in a suitable manner. A match lighting opening 37 is formed through the wall 21 so that a match may be inserted to light the gas in the chamber 22. A peek-hole or window 38 is formed through the wall 25 so that the action of the fire may be observed, and a shutter 39 is mounted to swing over this opening 38, the shutter being connected by a screw 40 tapped into the metal above the opening, so that the shutter will swing to a closed position by gravity. A handle 41 extends downwardly from the shutter 39 in position to cover the opening 37.

In the operation, a lighted match is inserted through the opening 37, the valve 2 manipulated to turn on the gas, and the gas will ignite in the chamber 22 outside of the burner head 8 and the flame will shoot directly against the inner face of the wall 21. Fresh air will pass upwardly through the opening 20 and the mixture of air, gas and flame will pass upwardly through the opening 23 and circulate in the chamber 24, then pass through the opening 26, and circulate in the chamber 27, then through the opening 29 and circulate in the chamber 30, then through the opening 32 into the chamber 33, and the products of combustion will pass through the opening 36 to the flue 35. The walls 21, 25, 28, 31 and 34 will become very highly heated and will radiate this heat directly into the room. All of the gas will be thoroughly consumed before reaching the chamber 33 and only a small percentage of the heat will pass up the flue.

The flame issuing from the burner head 8 will, on striking the wall 21, be reflected back into the path of the gas and air and be thoroughly mixed before passing on to the combustion chamber 24, immediately above the burner head 8. The constricted passage 23 will cause the volume of gas, air and flame to be whirled about and to form a homogeneous mixture. On reaching the center of the combustion chamber 24, the hot gases will expand and in passing to chamber 27 immediately above chamber 24, will again pass a constricted passage and so on through chambers 30 and 33. The alternate expansion and contraction of the gases will cause a whirling motion of the hot gases, thereby effecting perfect and complete combustion of all the fuel gases and a blue and perfectly odorless flame will be produced. Not only will complete combustion be effected, but the hot gases will be retarded in their upward passage, thereby increasing the time during which they are in contact with the walls of the heater, and thus increase the efficiency of the heater.

Various changes may be made in the details of construction without departing from the spirit of my invention as claimed.

I claim:

In a gas heater, a burner head having an annular screen around a vertical axis, said screen bulging outwardly between its upper and lower edges and the perforations in the face screen being at right angles to the face around the perforations, and a cross section through the wall of the screen being substantially a semi-circle, and means forming a wall on the combustion chamber having a wall on the level of the burner screen and equally spaced therefrom all the way around, said wall being semi-circular in vertical cross section and there being restricted openings below and above the burner screen, so that the flame from the burner screen will strike directly against the inner face of the combustion chamber wall.

In testimony whereof I have signed my name to this specification.

JAMES BEARD.

Copies of this patent may be obtained for five cents each, by addressing the "Commissioner of Patents, Washington, D. C."